United States Patent [19]
Sakurai et al.

[11] Patent Number: 5,950,032
[45] Date of Patent: Sep. 7, 1999

[54] CAMERA

[75] Inventors: Hidenori Sakurai, Hachioji; Lei Shi, Kami-ina-gun; Masayu Higuchi, Hachioji, all of Japan

[73] Assignee: Olympus Optical Co., Ltd., Tokyo, Japan

[21] Appl. No.: 08/663,902

[22] Filed: Jun. 14, 1996

[30] Foreign Application Priority Data

Jun. 15, 1995 [JP] Japan .................................. 7-149140

[51] Int. Cl.$^6$ .................................................. G03B 17/02
[52] U.S. Cl. ............................................................ 396/538
[58] Field of Search ................................... 396/538, 512, 396/515

[56] References Cited

U.S. PATENT DOCUMENTS

| | | | |
|---|---|---|---|
| 4,423,943 | 1/1984 | Gold ..................................... | 396/512 X |
| 4,994,828 | 2/1991 | Smart .................................... | 396/512 X |
| 4,998,123 | 3/1991 | Smart ..................................... | 396/515 |
| 5,296,887 | 3/1994 | Zander ................................. | 396/512 X |
| 5,432,573 | 7/1995 | Lawther et al. ....................... | 396/538 |

FOREIGN PATENT DOCUMENTS

| | | |
|---|---|---|
| 4-90530 | 3/1992 | Japan . |
| 5-158142 | 10/1993 | Japan . |
| 06301106 | 10/1994 | Japan . |

OTHER PUBLICATIONS

English translation of Japanese document 05–158142.

Primary Examiner—Howard B. Blankenship
Attorney, Agent, or Firm—Louis Weinstein

[57] ABSTRACT

A camera which uses a film cartridge equipped with an indicating section for indicating an exposed state of a film housed within the film cartridge comprises a film compartment for accommodating the film cartridge, a cover member for closing the film compartment, and an ejector formed within the film compartment. The ejector blocks the mounting of the film cartridge in readiness for photographing when the exposure-state indicating section takes a development-completed condition indicating position, a completely exposed condition indicating position or a partially exposed condition indicating position, while allowing the film cartridge to be mounted therein for photographing when it takes a non-exposed condition indicating position. In addition, the ejector pushes the film cartridge out of the film compartment when the cover member is opened after a completion of photography. The ejector can be provided with a member which prevents a film cartridge from inadvertently dropping out the camera during unloading thereof.

25 Claims, 13 Drawing Sheets

CAMERA

BACKGROUND OF THE INVENTION

1. Field of the Invention

The present invention relates to a camera, and more particularly to a camera using a film cartridge equipped with a means for indicating an exposed state of a film.

2. Related Art Statement

A photographic film is generally handled in a state of being housed within a film cartridge which is a simple cartridge with a light screening or shielding function for the purpose of its protection against exposure in mounting and removing in and from a camera or during storage and conveyance. In addition, the decision on whether a film is in a non-exposed condition or in an exposure-completed condition is made by checking whether or not a tip portion of the film is drawn out from a film-drawing opening of the film cartridge.

U.S. Pat. Nos. 4,423,943, 4,998,123, and 5,296,887 disclose a new type of cartridge different from the prior types, where a film is completely or entirely accommodated therein regardless of being in a non-exposed condition, a partially exposed condition or an exposure-completed condition. In this instance, the film-mounting into a camera is automatically made in such a manner that a fork and a spool geared therewith are rotatively driven with a motor, with the result that the carelessness of the user can cause double exposure to the film.

On the other hand, U.S. Pat. No. 4,994,828 or Japanese Unexamined Patent Publication No. 6-301106 has proposed an approach to eliminate this problem, where a camera is provided with a sensor means cooperating with an exposure-state indicating device so that the insertion of the film cartridge into a film compartment (cartridge compartment) is inhibited when the exposure-state indicating device assumes an exposure-completed condition. In addition, as exemplified by Japanese Unexamined Patent Publication No. 4-90530, there has been proposed an ejecting means which pushes out a film cartridge by a biasing means such as a spring in response to a film cartridge ejecting operation.

There is a problem which arises with the provision of this sensor means, however, in that a side wall of the film cartridge suffers damages and the mounting of the film cartridge requires a larger force due to the resulting occurrence of a friction between the sensor means and the film cartridge, for that the sensor means is generally biased by a spring to protrude into the film compartment and made to retreat from the cartridge sitting position and then to come into contact with a side wall of the film cartridge when a non-exposed film cartridge is mounted therein. In addition, when the film cartridge is taken out from the film compartment after the completion of photography, difficulty is experienced to easily remove the film cartridge from the film compartment due to the frictional force taking place between the sensor means and the film cartridge.

What is worse, in the case of the apparatus disclosed by the aforesaid Japanese Unexamined Patent Publication No. 6-301106, if the film cartridge once mounted therein is taken out halfway after the photography completion and then again mounted immediately before its insertion-inhibiting function begins to work, the camera operates normally to result in double exposure.

OBJECTS AND SUMMARY OF THE INVENTION

It is therefore a first object of the present invention to provide a camera which is capable of permitting the mounting of a film cartridge in accordance with an exposed state of a film and further of allowing the film cartridge to be surely taken out therefrom after the completion of photography.

A second object of this invention is to provide a camera which can initially push out a film cartridge up to a certain position for its removal and then hold it at the position for prevention from inadvertently dropping out of the camera.

In accordance with the present invention, in a camera using a film cartridge accommodating a film and having the foregoing exposure-state indicating section, there are basically included a film compartment for accommodating the film cartridge, a cover member for closing the film compartment, and an ejector formed within the film compartment for blocking the insertion of the film cartridge when the exposure-state indicating section takes a development-finish condition indicating position, an exposure-completed condition indicating position or a partially exposed condition indicating position while allowing the mounting of the film cartridge in the film compartment when the exposure-state indicating section is at a non-exposed condition indicating position, and further for pushing the film cartridge out of the film compartment in response to the opening of the cover member after the completion of photography.

These as well as others objects and advantages of the present invention will become further apparent from the following detailed explanation.

DETAILED DESCRIPTION OF THE PREFERRED EMBODIMENTS

A description will be made hereinbelow about embodiments of the present invention with reference to the drawings.

Figure 1:
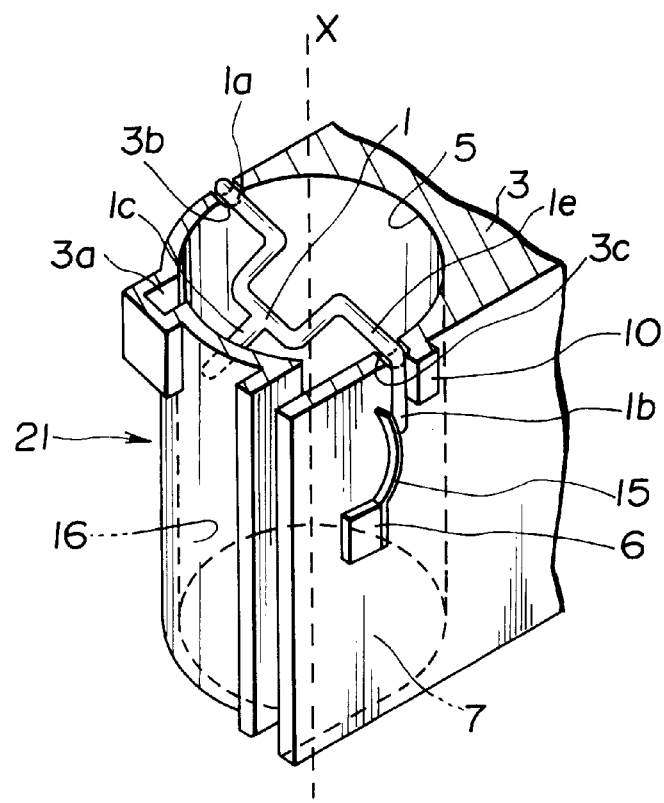
FIG. 1 is a perspective view showing a principal portion of a film compartment of a camera according to a first embodiment of the present invention and illustrating a film cartridge for use in the camera.
Figure 1:
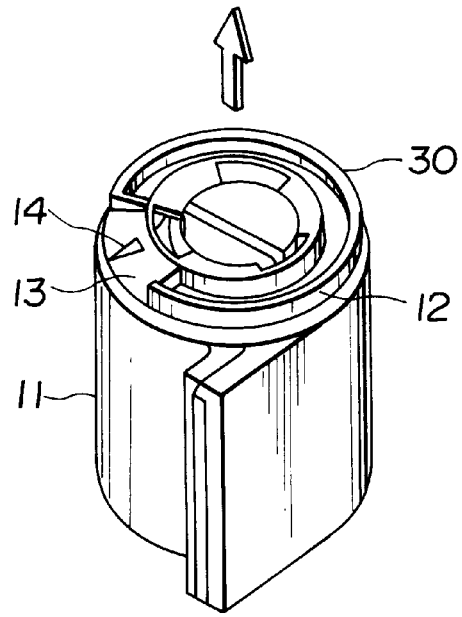

FIG. 1 is a perspective view showing a principal portion of a film compartment of a camera according to a first embodiment of the present invention and illustrating a film cartridge for use in the camera. In this illustration, the film compartment and the film cartridge are shown in states of standing upside down for the convenience to the description.

In this embodiment, as disclosed by U.S. Pat. Nos. 4,994,828, 4,998,123 and 5,296,887 a film cartridge 11 for use in a camera 21 is provided with an exposure-state indicating means 30 for showing an exposed state of a film within the film cartridge 11, which is made to to be movable from a non-exposed condition indicating position visibly representing the fact that the film is in a non-exposed condition to a partially-exposed condition indicating position visibly designating a partially exposed condition of the film, an exposure-completed condition indicating position visibly denoting a completely exposed condition of the film, or a development-completed condition indicating position visibly signifying a fully developed condition of the film. Furthermore, a body 3 of the aforesaid camera 21 has a film compartment 5 formed at its one side to accommodate the film cartridge 11. FIG. 1 shows the film compartment 5 and parts in the vicinity thereof with a portion of a bottom (the upper side of the illustration) of the film compartment 5 broken.

As shown in FIG. 1, in a top surface side (the lower side of the illustration) of the film compartment 5 there is formed an opening section 7 serving as a loading gate for the insertion of the film cartridge 11. With this structure, the film cartridge 11 is fitted into the film compartment 5 in its one longitudinal direction, i.e., an arrow direction of the axial directions (X in the illustration). In addition, the film compartment 5 has a film supply opening engaging with a film supply section of the film cartridge 11. A projection 6 is provided to protrude at a given place of a back side (the front side of the illustration) of the camera body 3, and a proximal or base portion of a leaf spring 15 is fixedly secured onto one side surface of the projection 6. The leaf spring 15 is provided to extend toward an upper side of the film compartment 5 so that its tip portion comes into contact with a lever section 1b which will be described in detail later.

Moreover, the film compartment 5 is provided in one side portion of the camera body 3 as described before, whereas its inner wall surface acts as an insertion guide for the film cartridge 11. Further, supporting sections 3b, 3c are provided in a front face and a rear face of a wall of the camera body 3 at the bottom side (the upper side of the illustration) of the film compartment 5. A bar-like member 1 serving both as a film exposure-state sensor (detector) and a film ejector has both end portions 1a, 1e placed and supported on the supporting sections 3b, 3c, respectively. In the illustration, a portion of the bottom side of the film compartment 5 is broken to expose the aforesaid film exposure-state sensing and cartridge ejecting device 1, thus showing only lower sides of the holes constituting the supporting sections 3b, 3c.

In addition, the end portion 1e of the film exposure-state sensing and cartridge ejecting device 1 in the rear surface side of the camera body 3 extends toward the upper side of the camera body 3 (the lower side of the illustration) to thereby form the above-mentioned lever section 1b. The lever section 1b is rotatably supported by the supporting section 3c, and its tip portion is brought in contact with the tip portion of the leaf spring 15 to be biased counterclockwise in the illustration. A stopping section 10 is formed to protrude toward the rear surface side of the camera body 3 in the vicinity of the supporting section 3c to restrict the rotation of the lever section 1b undergoing the biasing force of the leaf spring 15. In addition, the aforesaid film exposure-state sensing and cartridge ejecting device 1 has an intermediate portion bent substantially rectangularly toward the interior of the film compartment 5 and further a bar-like engaging section 1c extends from a peak portion of the rectangularly bent intermediate portion.

Figure 2:
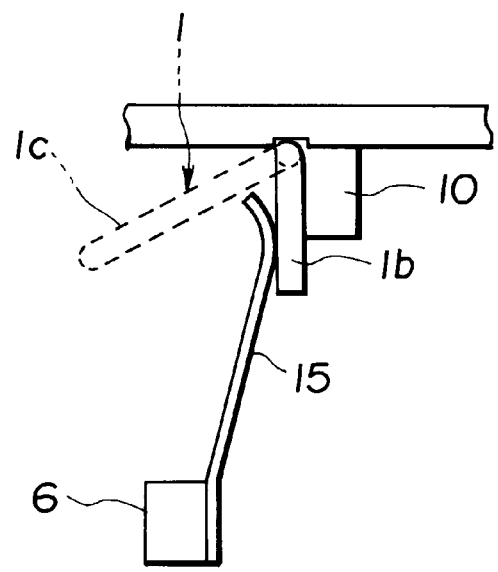
FIG. 2 is a side elevational view of a principal portion of a mechanism shown in FIG. 1, showing the positional relationship among a lever section, an engaging section and a leaf spring of a film exposure-state sensing and cartridge ejecting device in a non-mounted condition of a film cartridge in a camera according to the first embodiment.
Figure 3:
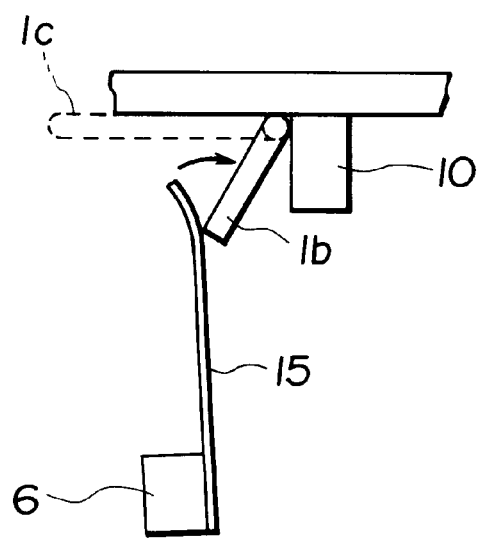
FIG. 3 is a side elevational view of a main portion of a mechanism in FIG. 1, showing the positional relationship among the lever section, engaging section and leaf spring of the film exposure-state sensing and cartridge ejecting device in the mounted condition of the film cartridge in the camera according to the first embodiment.

FIGS. 2 and 3 are side elevational views of principal portions of the mechanism, showing the positional relationship among the lever section 1b, engaging section 1c and the leaf spring 15. Of these drawings, FIG. 2 shows a state when the film cartridge 11 is in a non-mounted condition, and FIG. 3 illustrates a mounted state of of the film cartridge 11. In this case, the lever section 1b and the engaging section 1c takes an integrally constructed condition, whereupon the engaging section 1c rotates within the film compartment 5 in connection with the rotation of the lever section 1b. Further, since the rotatable range of the engaging section 1c depends upon the stopping section 10, the rotatable range of the engaging section 1c also undergoes the restriction, that is, a restriction is made to the protruding amount into the interior of the film compartment 5.

The aforesaid engaging section 1c is provided to be allowed to come into contact with the exposure-state indicating means 30 for showing an exposed state of the film within the film cartridge 11 when the film cartridge 11 is loaded into the film compartment 5. Further, although a detailed description will be taken later, it serves to make an indication on whether or not to permit the insertion of the film cartridge 11 in accordance with an exposed state of the encased film. The exposure-state indicating means 30, as shown in FIG. 1, is equipped with a ring-like lip section 12 formed on the top surface of the film cartridge 11 to extend around the axis X approximately 270 degrees in the form of a sector and an inclined section 13 formed between both end portions of the ring-like lip portion 12 to have a sector configuration diverging from the axis X at approximately 90 degrees. The ring-like lip section 12 defines a groove portion extending around the axis X in a coaxial relation thereto, which engages with the tip portion of the engaging section 1c in accordance with an exposed condition of the encased film as will be described later. The aforesaid inclined section 13 forms an inclined surface having a taper-like configuration diverging toward its outer circumference, which comes into contact with the tip portion of the engaging section 1c in accordance with an exposed condition of the housed film as will be described later. That is, in mounting the film cartridge 11 into the film compartment 5, the tip portion of the engaging section 1c engages with the groove portion of the ring-like lip section 12 (see FIG. 4) when the film housed is in an exposure-completed condition, a partially exposed condition or a development-completed condition, while coming into contact with the inclined surface of the inclined section 13 when being in an non-exposed condition (see FIG. 5).

Figure 4:
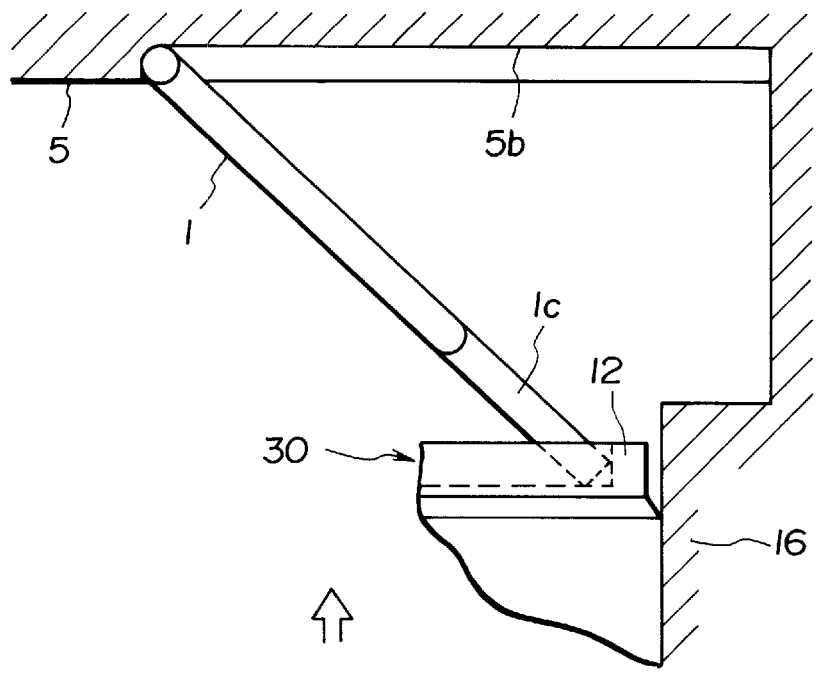
FIG. 4 is a side elevational view of a main portion of a mechanism shown in FIG. 1, showing the film exposure-state sensing and cartridge ejecting device and its associated parts when mounted in a film cartridge accepting a film which is in a completely exposed condition or a partially exposed condition, in the camera according to the first embodiment.

Secondly, an operation of the camera thus arranged according to this embodiment will be described with reference to FIGS. 2 to 6. First of all, the description will start with the case that the film cartridge 11 is loaded when the film encased therein takes a completely exposed condition, a partially exposed condition or a completely developed condition. FIG. 4 is a side elevational view of a principal portion of the cartridge chamber, showing a state in which the film cartridge 11 is mounted when the film encased therein is in the completely exposed condition, partially exposed condition or completely developed condition. In this instance, the aforesaid exposure-state indicating means 30 stands at an exposure-completed condition indicating position, a partially-exposed condition indicating position or a development-completed condition indicating position. In response to mounting such a film cartridge 11 in the film compartment 5 by the user, the aforesaid engaging section 1c tip portion is brought into contact with the groove portion of the ring-like lip section 12. When further inserting the film cartridge 11 from this state (the arrow direction in the illustration), the tip portion of the engaging section 1c is fitted in the groove portion of the ring-like lip section 12 to press the ring-like lip section 12 to the external, i.e., toward an inner wall surface 16 of the film compartment 5. Although the film cartridge 11 is slightly inserted until its outer circumferential surface comes into contact with the inner wall surface 16, then the engaging section 1c (the film exposure-state sensing and cartridge ejecting device 1), engaged with the groove portion of the ring-like lip section 12, blocks the film cartridge 11 and does not allow further insertion thereinto.

Figure 5:
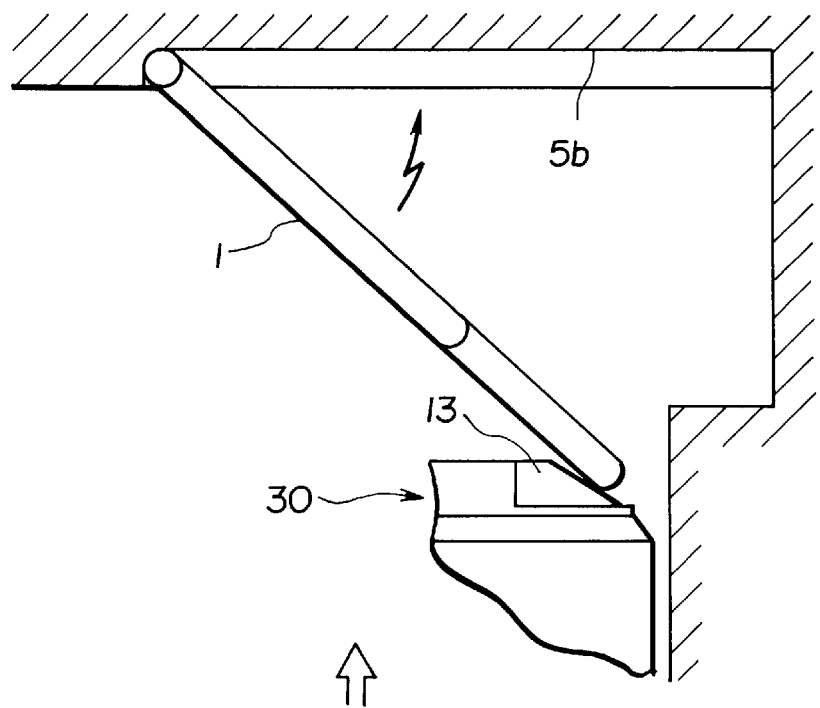
FIG. 5 is a side elevational view of a main portion of a mechanism shown in FIG. 1, showing the film exposure-state sensing and cartridge ejecting device and its associated parts when mounted in the film cartridge accommodating a film which is in the non-exposed condition, in the camera according to the first embodiment.
Figure 6:
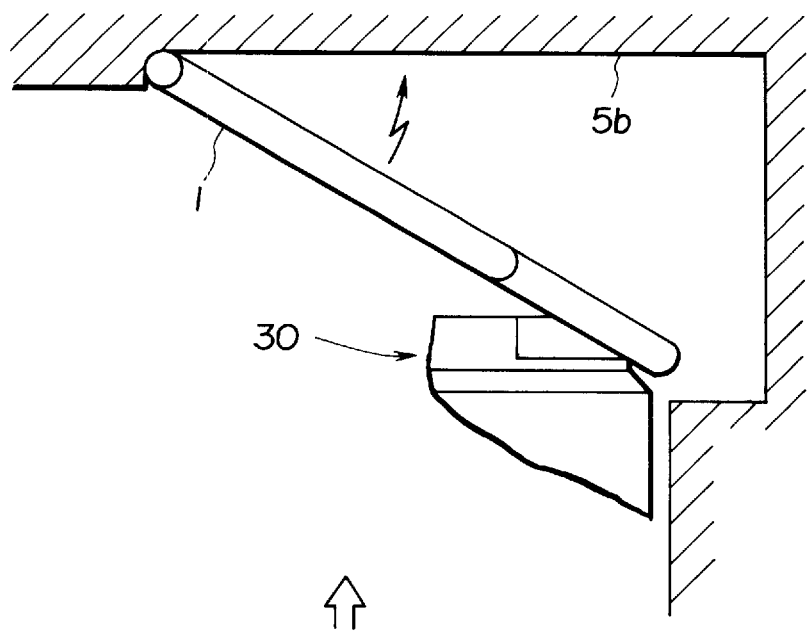
FIG. 6 is a side elevational view of a main portion of a mechanism shown in FIG. 1, showing the film exposure-state sensing and cartridge ejecting device and its associated parts when mounted in the film cartridge accommodating a film which is in the non-exposed condition, in the camera according to the first embodiment.
Figure 7:
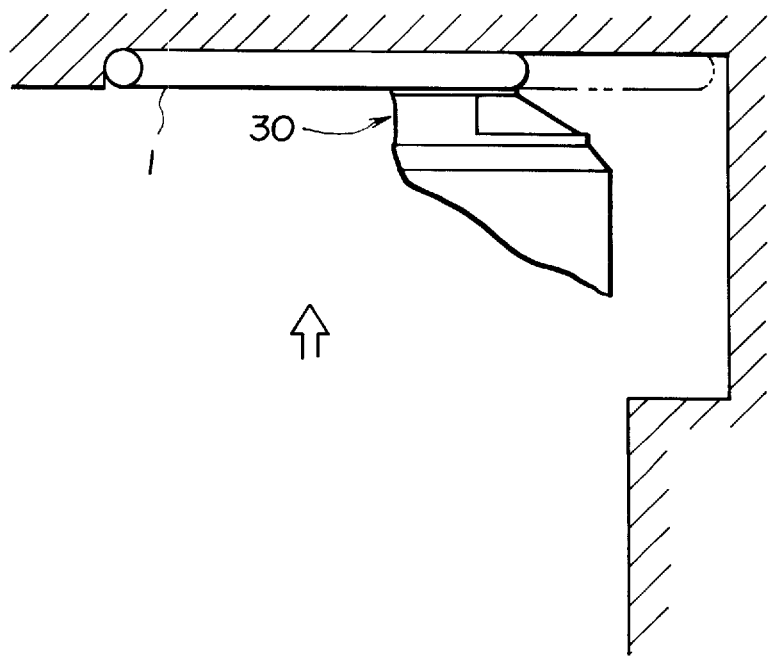
FIG. 7 is a side elevational view of a main portion of a mechanism shown in FIG. 1, showing the film exposure-state sensing and cartridge ejecting device and its associated parts when mounted in the film cartridge accommodating a film which is in the non-exposed condition, in the camera according to the first embodiment.

Furthermore, a description will be taken hereinbelow of the case that the film cartridge 11 is loaded with the film encased therein being in a non-exposed condition. FIGS. 5 to 7 are side elevational views of a principal portion of the cartridge chamber mechanism, showing states that the film cartridge 11 is mounted when the film enclosed therein is in an non-exposed condition. In this instance, the exposure-state indicating means 30 assumes an non-exposed condition indicating position. When the user inserts into the film compartment 5 the film cartridge being in such a condition, the tip portion of the engaging section 1c comes into contact with the inclined surface of the inclined section 13 (see FIG. 5). When further inserting the film cartridge 11 from this state (the arrow direction in the illustration), the tip portion of the engaging section 1c is pushed upwardly in the arrow direction in the illustration along the inclined surface of the inclined section 13 against the elastic force of the leaf spring 15 (see FIG. 6), and the film cartridge 11 is inserted until the engaging section 1c finally comes into contact with a housing section 5b formed on a bottom surface 5a of the film compartment 5 (see FIG. 7). Thereafter, the film cartridge 11 is fixed by operations such as by closing a film compartment cover, not shown, while at this time the biasing force of the leaf spring 15 accumulates in the engaging section 1c. If the film compartment cover is opened after the completion of photography, the biasing force of the leaf spring 15 accumulated in the engaging section 1c presses the film cartridge 11 toward the exterior of the film compartment 5 (in a direction opposite to the arrow direction in FIG. 7), thereby pushing the film cartridge 11 out of the film compartment 5.

With the above-described structure, the camera according to this embodiment can automatically push out the film cartridge after the completion of photography concurrently with inhibiting the mounting of the film cartridge being in an exposure-completed condition, a partially exposed condition or a development-completed condition. In addition, the film exposure-state sensing and cartridge ejecting device 1 is located and housed in the bottom portion of the film compartment 5, which can reduce the necessary space for the size reduction of the camera.

Figure 8:
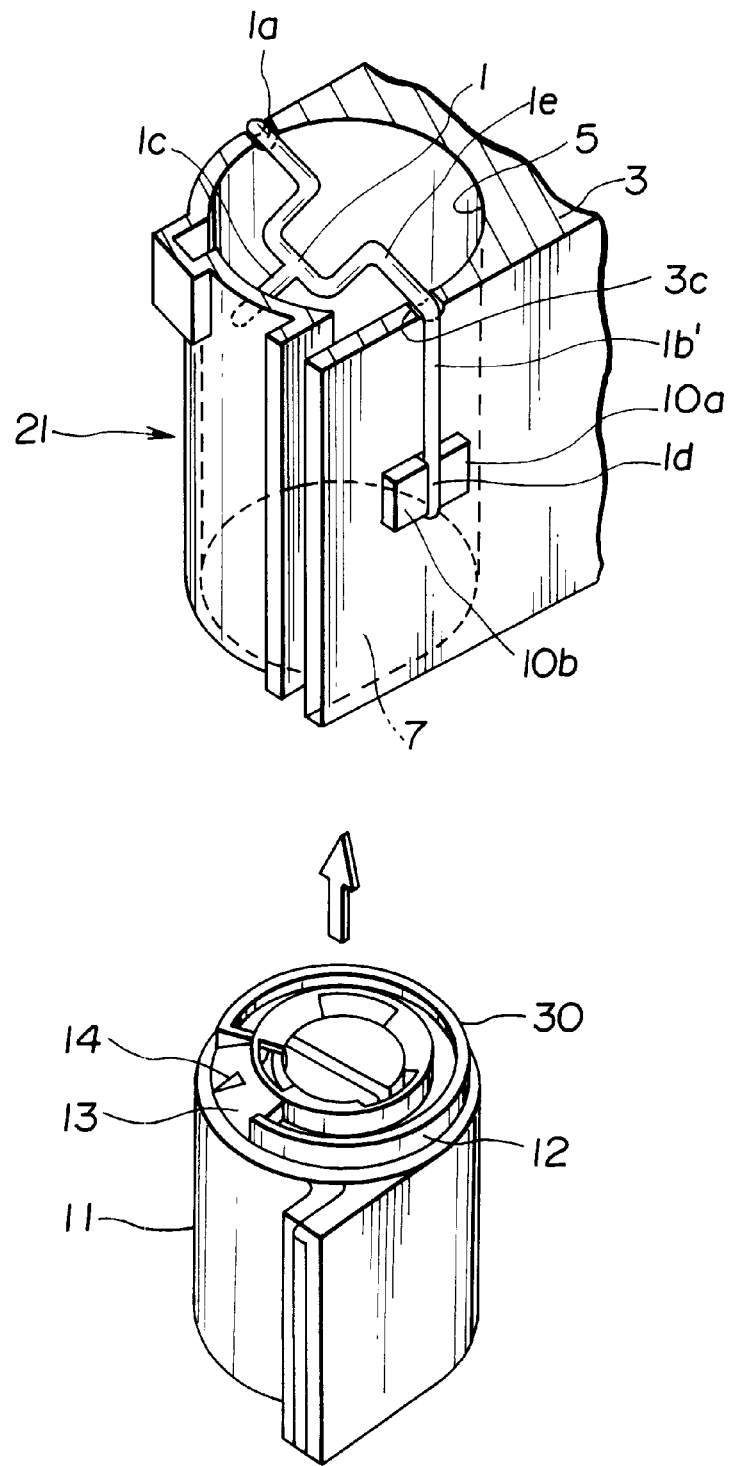
FIG. 8 is a perspective view showing a principal portion of a film compartment of a camera according to a second embodiment of the present invention and further showing a film cartridge for use in the camera.

A description will be made hereinbelow of a second embodiment of the present invention. FIG. 8 is a perspective view showing a principal portion of a film compartment of a camera according to the second embodiment and a film cartridge for use in the camera. In this illustration, the film compartment and the film cartridge are shown in states of standing upside down for the convenience to the description. Further, parts corresponding to those in the above-described first embodiment are marked with the same numerals, and the detailed description thereof will be omitted in order to avoid a double explanation.

The camera according to this second embodiment basically has a construction similar to that of the first embodiment, while the different points therebetween are as follows. That is, in the first embodiment the lever section 1b formed at one end portion of the film exposure-state sensing and cartridge ejecting device 1 receives the elastic force of the leaf spring 15 so that the engaging section 1c of the film exposure-state sensing and cartridge ejecting device 1 is biased to rotate toward the interior of the film compartment 5. On the other hand, in this second embodiment the lever section 1b (1b') itself is made from an elastic member and further its one end portion 1d is interposed between supporting sections 10a, 10b provided protrusively at given places of the rear side of the camera body 3. Other structures and operations are the same as those in the aforementioned first embodiment, and hence the description thereof will be omitted for brevity.

In this second embodiment the aforesaid lever section 1b' is supported by the supporting section 3c to be rotatable within a range depending upon its elastic force. In addition, although being restricted by the stopping sections 10a, 10b in the movement in the horizontal directions in the illustration, the end portion 1d is arranged to be slidable up and down (see FIGS. 9 and 10). As well as the above-described first embodiment, in the second embodiment the film exposure-state sensing and cartridge ejecting device 1 also has an intermediate portion bent substantially rectangularly toward the interior of the film compartment 5 and a bar-like engaging section 1c is provided protrusively at a peak portion of the rectangularly formed portion thereof so that its tip portion is able to come into contact with the exposure-state indicating means 30 of the film cartridge 11 inserted.

Figure 9:
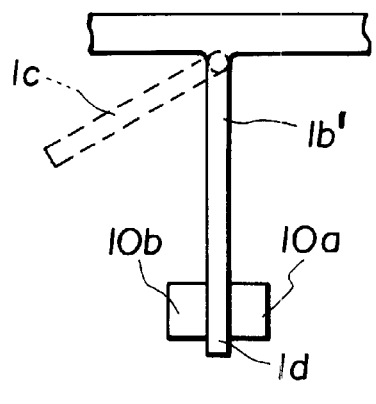
FIG. 9 is a side elevational view of a principal portion of a mechanism shown in FIG. 8, showing the positional relationship among a lever section, an engaging section and a stopping section of a film exposure-state sensing and cartridge ejecting device in a non-mounted condition of a film cartridge in a camera according to the second embodiment.
Figure 10:
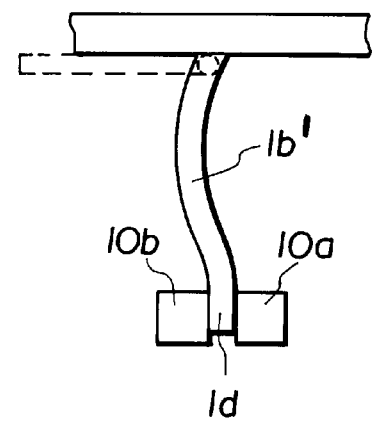
FIG. 10 is a side elevational view of a principal portion of a mechanism shown in FIG. 8, showing the positional relationship among the lever section, the engaging section and the stopping section of a film exposure-state sensing and cartridge ejecting device in a mounted condition of a film cartridge in a camera according to the second embodiment.

FIGS. 9 and 10 are side elevational views of a principal portion of the cartridge chamber mechanism, showing the positional relationship among the lever section 1b', the engaging section 1c, the end portion 1d and the stopping sections 10a, 10b. Of these drawings, FIG. 9 shows a state when the film cartridge 11 is in a non-mounted condition while FIG. 10 illustrates a state at the time of mounting the film cartridge 11. The engaging section 1c, the lever section 1b' and the end portion 1d are integrally constructed, and the rotatable range of the engaging section 1c in the direction of protruding into the interior of the film compartment 5 is restricted due to the relationship between the stopping sections 10a, 10b and the end portion 1d. In addition, as well as the first embodiment, the engaging section 1c can come into contact with the exposure-state indicating means 30 for displaying an exposed condition of a film within the film cartridge 11 when the film cartridge 11 is loaded in the film compartment 5. Further, it serves to make an indication on whether or not to permit the insertion of the film cartridge 11 in accordance with an exposed state of the encased film. That is, in mounting the film cartridge 11 in the film compartment 5, the tip portion of the engaging section 1c engages with the groove portion of the ring-like lip section 12 when the encased film is in an exposure-completed condition or a partially exposed condition (see FIG. 4) while coming into contact with the inclined surface of the inclined section 13 when it is in a non-exposed condition (see FIG. 5).

Secondly, the operation of the camera thus arranged according to the second embodiment will be described hereinbelow with reference to FIGS. 9, 10 and 4 to 6. First of all, if the film cartridge 11 is inserted into the film compartment 5 in a state where the film held within the film cartridge 11 is in a completely exposed condition, a partially exposed condition or a completely developed condition, in the same manner as the above-described first embodiment the film cartridge 11 undergoes the interference by the engaging section 1c (the film exposure-state sensing and cartridge ejecting device 1) engaged with the groove portion of the ring-like lip section 12, which inhibits further insertion of the film cartridge 11 (see FIG. 4).

Secondly, referring to FIGS. 5 to 7, 9 and 10 a description will be made hereinbelow about the case that the film cartridge 11 is mounted when the film encased therein assumes a non-exposed condition. FIGS. 5 to 7 are side elevational views of a principal portion, showing states in which the film cartridge 11 is loaded when the film enclosed therein is in a non-exposed condition. At this time, the aforesaid exposure-state indicating means 30 takes the non-exposed condition indicating position. If the user inserts such a film cartridge 111 into the film compartment 5, the tip portion of the engaging section 1c is brought into contact with the inclined surface of the inclined section 13 (see FIG. 5). Responding to further insertion of the film cartridge 11 from this state (the arrow direction in the illustration), the tip portion of the engaging section 1c is pushed upwardly in the arrow direction in the illustration along the inclined surface of the inclined section 13 against the elastic force of the end portion 1d (see FIG. 6), with the result the film cartridge 11 is finally inserted until the engaging section 1c comes into contact with the housing section 5b formed in the bottom surface 5a of the film compartment 5 (see FIG. 7).

At this time, the proximal portion of the lever section 1b' integrally constructed with the engaging section 1c receives the clockwise rotational biasing force about the supporting section 3c. Accompanying this, a clockwise elastic deformation takes place at the free end portion of the lever section 1b' as shown in FIG. 10. Simultaneously, the end portion 1d slightly slides vertically between the stopping sections 10a, 10b.

Thus, the engaging section 1c accepts a biasing force in the direction of protruding toward the interior of the film compartment 5, and when the film cartridge 11 gets into a fixed state by the closure of the film compartment cover (not shown) or the like after the insertion of the film cartridge 11, the aforesaid biasing force accumulates in the engaging section 1c. In response to the closure of the film compartment cover after the completion of photography, due to the elastic force of the lever section 1b' accumulated in the engaging section 1c, the film cartridge 11 is pressed in the direction of protruding from the film compartment 5 (the direction opposite to the arrow direction in FIG. 7), thereby exiting from the film compartment 5.

In addition to the effects of the above-described first embodiment, the camera according to this second embodiment can omit the leaf spring 15 which gives the biasing force to the film exposure-state sensing and cartridge ejecting device 1, thus resulting in a cheaper camera with a more simplified construction.

Figure 11:
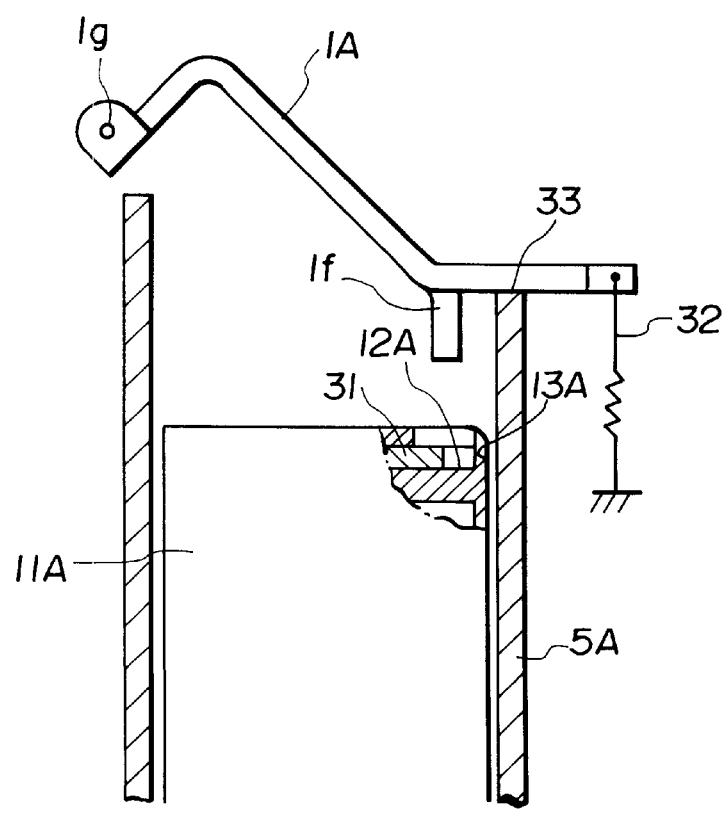
FIG. 11 is a side cross-sectional view of a principal portion of a film compartment mechanism, showing a state in which a film cartridge, which is in a condition other than a non-exposed condition, is being mounted in a film compartment in a camera according to a third embodiment of this invention.

Furthermore, a description will be taken hereinbelow of a third embodiment of the present invention. FIGS. 11 to 19 are side cross-sectional views of a principal portion of a cartridge chamber, showing a film compartment and a film exposure-state sensing and cartridge ejecting device of a camera according to the third embodiment and further showing a film cartridge to be mounted in the film compartment. Of these drawings, FIG. 11 is a side cross-sectional view of a principal portion of the chamber, showing a state in which a film cartridge taking a condition other than a non-exposed condition is loaded in the film compartment in the camera according to the third embodiment. In this illustration, the film cartridge is halfway inserted thereinto.

As illustrated, a film exposure-state sensing and cartridge ejecting device 1A is provided within a bottom portion (the upper side of the illustration) of a film compartment 5A. This film exposure-state sensing and cartridge ejecting device 1A has a substantially L-shaped arm configuration, with its proximal end portion being rotatably pivoted by a shaft 1g and, after once being bent to make an L-shaped configuration, its free end portion extending while being again bent at a given angle. Between the tip portion of the arm and a given place of the camera body there is provided an elastic member 32 constructed, for example, of a tension spring whereby the free end portion of the film exposure-state sensing and cartridge ejecting device 1A is biased downwardly in the illustration, i.e., clockwise about pivot shaft 1g. The location of the elastic member is not limited to the place illustrated if providing the same operation and effect. In addition, when the film exposure-state sensing and cartridge ejecting device 1A is rotated clockwise, its portion close to its tip portion comes into contact with one end surface 33 of the film compartment 5A to inhibit further rotation thereof.

Moreover, an engaging section 1f extends from the second-mentioned bent portion of the free end portion of the film exposure-state sensing and cartridge ejecting device 1A toward the interior (downward in the illustration) of the film compartment 5A. At the mounting of the film cartridge 11A the engaging section 1f is designed to be fitted in a ring-like recess or cavity portion 12A made in the top surface of the film cartridge 11A. A detailed description thereof will be made later.

The film cartridge 11A, as mentioned above, has the ring-like recess portion 12A coaxially formed around its axis in its top surface. At the outermost circumferential portion of the ring-like recess section 12A there is formed a side wall protruding upwardly, a portion of which has, on its top surface, an inclined section 13A inclined and tapered toward its outer circumference. In addition, when the film cartridge 11A is mounted, the tip portion of the engaging section 1f is arranged to come into engagement therewith in the vicinity of the inclined section 13A at the outer circumference of the ring-like recess section 12A. Moreover, on the top surface of the ring-like recess section 12A there is provided a disc 31, serving as an exposure-state indicating means, which is rotatable in connection with a spool, not shown, placed within the film cartridge 11A. In the disc 31, its circumferential portion partially projects to establish a larger-diameter section, so that the larger-diameter section is positioned to project at the position confronting the inclined section 13A when the film encased therein is in a non-exposed condition (see FIG. 15), whereas the smaller-diameter section appears when being in an exposure-completed condition, a partially exposed condition or a development-completed condition (see FIG. 11).

Furthermore, referring to FIGS. 11 to 14, a description will be made hereinbelow of an operation performed for when mounted in the film compartment 5A is the film cartridge 11A whose film is in the exposure-completed condition, the partially exposed condition or the development-completed condition.

Figure 12:
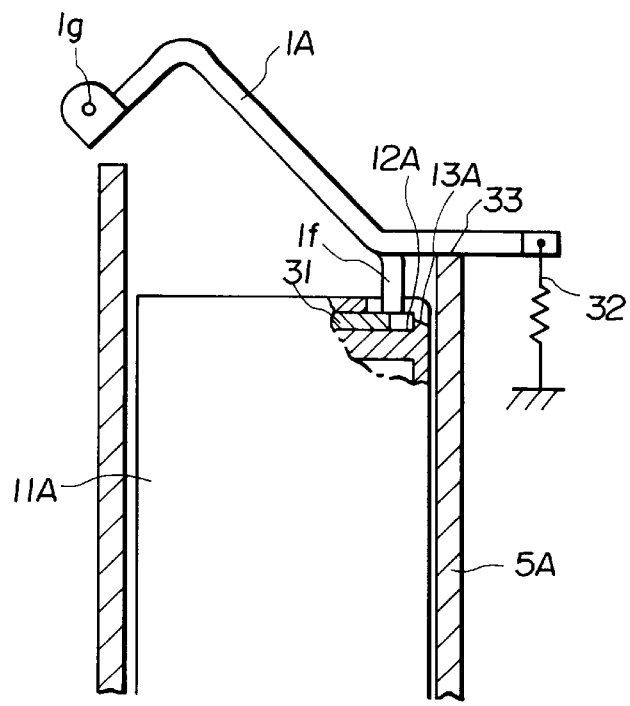
FIG. 12 is a side cross-sectional view of a principal portion of a film compartment mechanism, showing a state in which a film cartridge, which is in a condition other than a non-exposed condition, is being mounted in the film compartment in the camera according to the third embodiment.
Figure 13:
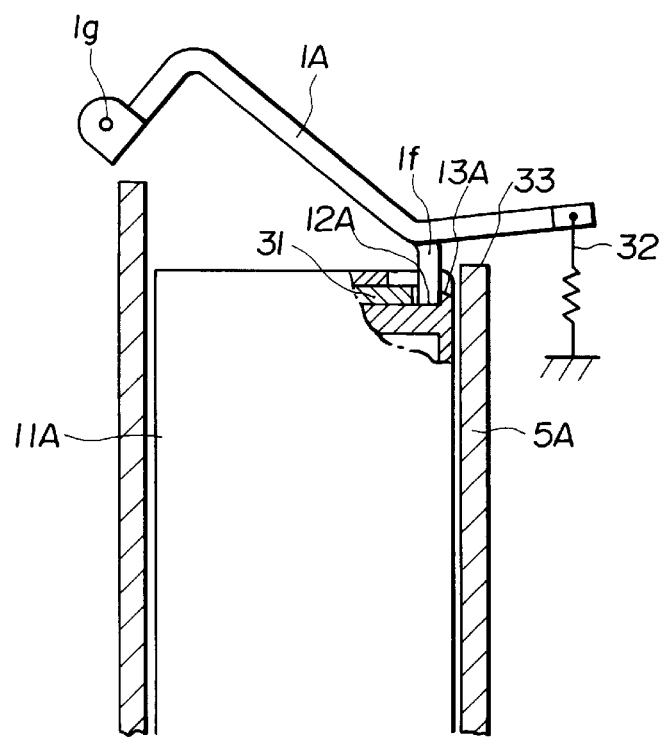
FIG. 13 is a side cross-sectional view of a principal portion of a film compartment mechanism, showing a state in which a film cartridge, which is in a condition other than a non-exposed condition, is being mounted in the film compartment in the camera according to the third embodiment.
Figure 14:
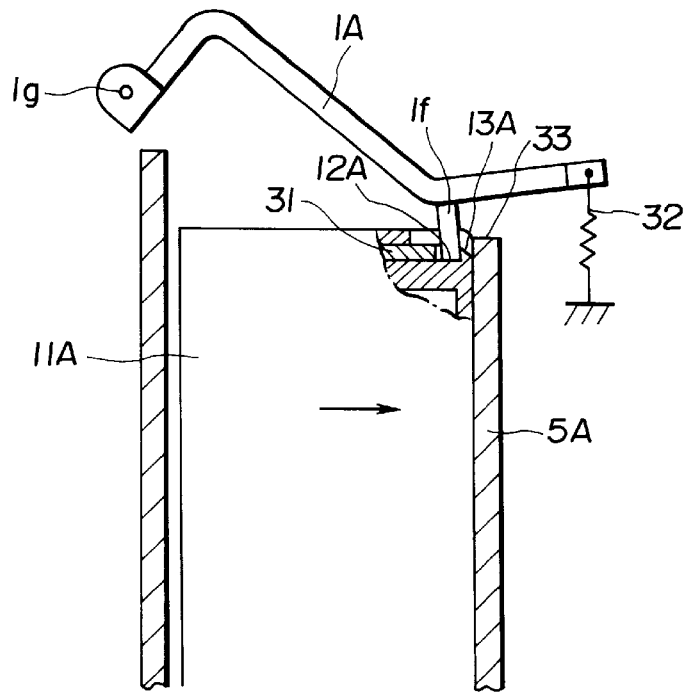
FIG. 14 is a side cross-sectional view of a principal portion of a film compartment mechanism, showing a state in which a film cartridge, which is in a condition other than a non-exposed condition, has been mounted in the film compartment in the camera according to the third embodiment.
Figure 15:
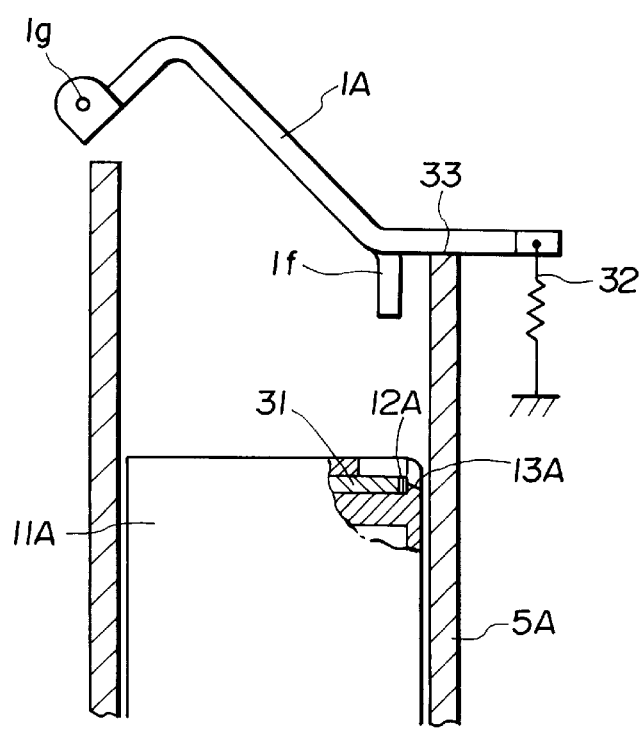
FIG. 15 is a side cross-sectional view of a principal portion of a film compartment mechanism, showing a state in which a film cartridge, which is in a non-exposed condition, is being mounted in the film compartment in the camera according to the third embodiment.

First, when the film cartridge 11A being in the above-mentioned condition is inserted into the film compartment 5A (see FIG. 11), as shown in FIG. 12 the tip portion of the engaging section 1f comes into contact with a side edge portion of the smaller-diameter section of the disc 31. In response to further insertion of the film cartridge 11A from this state, the engaging section 1f is slightly pushed up by the side edge portion of the disc 31 against the biasing force of the elastic member 32, with the result that the film exposure-state sensing and cartridge ejecting device 1A slightly rotates around the shaft 1g. Since section constructed to be integral with the film exposure-state sensing and cartridge ejecting device 1A, the engaging section 1f also rotates around the shaft 1g. Accordingly, with the insertion of the film cartridge 11A, the engaging section 1f separates from the side edge portion of the disc 31 to be fitted in between the side edge portion of the disc 31 and the side wall of the ring-like recess portion 12A due to the biasing force of the elastic member 32 (see FIG. 13). If the further insertion of the film cartridge 11A from this state takes place, the engaging section 1f is further rotated around the shaft 1g to press the side wall of the ring-like recess portion 12A in the arrow direction in the illustration, i.e., toward the inner wall surface of the film compartment 5A (see FIG. 14). Thus, the film cartridge 11A encounters a difficulty of further insertion due to the frictional force occurring with the inner wall surface thereof.

Figure 16:
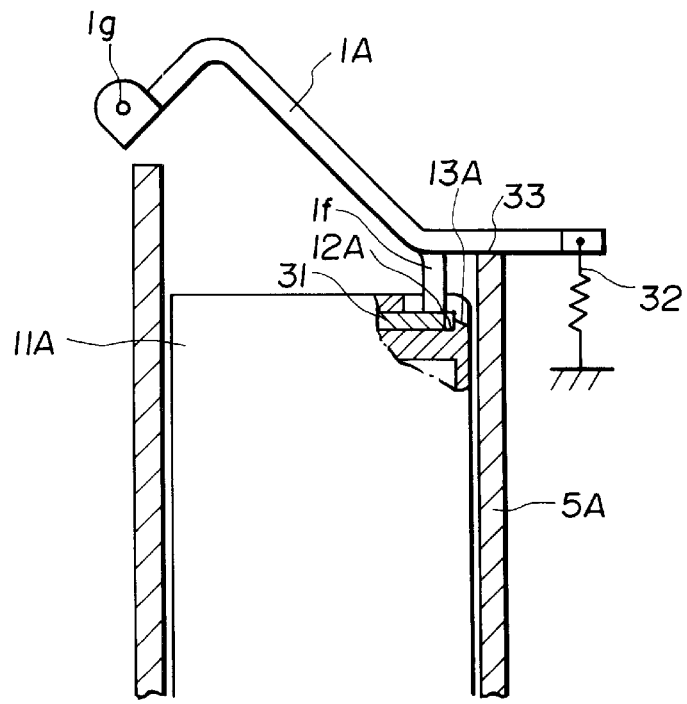
FIG. 16 is a side cross-sectional view of a principal portion of a film compartment mechanism, showing a state where a film cartridge, which is in a non-exposed condition, is being mounted in the film compartment in the camera according to the third embodiment.

Moreover, referring to FIGS. 15 to 18 a description will be made hereinbelow of an operation taken for when mounted in the film compartment 5A is the film cartridge whose film is in a non-exposed condition. First, when the film cartridge being in a non-exposed condition comes in the film compartment 5A (see FIG. 15), as illustrated in FIG. 16 the tip portion of the engaging section 1f comes into contact with a side edge portion of the larger-diameter section of the disc 31. Simultaneously with further insertion of the film cartridge 11A from this state, the engaging section if is slightly pushed up against the biasing force of the elastic member 32 by means of the side edge portion of the disc 31, whereupon the film exposure-state sensing and cartridge ejecting device 1A rotates around the shaft 1g. Since the engaging section 1f is constructed so as to be integral with the film exposure-state sensing and cartridge ejecting device 1A, similarly it rotates around the shaft 1g together with device 1A.

Figure 17:
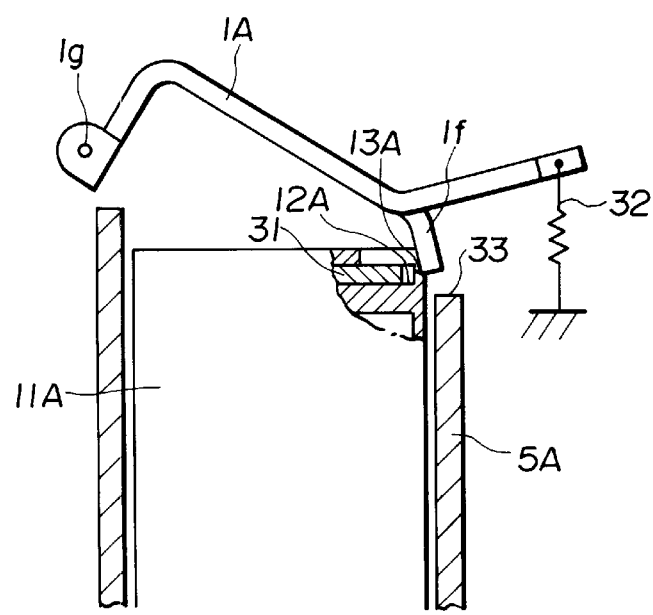
FIG. 17 is a side cross-sectional view of a principal portion of a film compartment mechanism, showing a state where a film cartridge, which is in a non-exposed condition, is being mounted in the film compartment in the camera according to the third embodiment.
Figure 18:
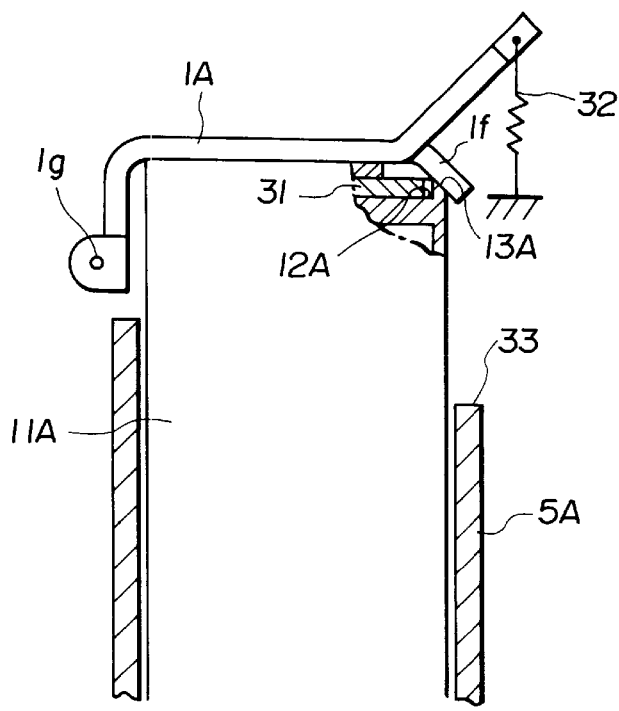
FIG. 18 is a side cross-sectional view of a principal portion of a film compartment mechanism, showing a state where a film cartridge, which is in a non-exposed condition, has been mounted in the film compartment in the camera according to the third embodiment.

Further insertion of the film cartridge 11A from this state permits the engaging section 1f to separate from the side edge portion of the disc 31 and then to slide along the inclined surface of the inclined section 13A, and the film exposure-state sensing and cartridge ejecting device 1A additionally rotates (see FIG. 17). Thereafter, when further insertion of the film cartridge 11A takes place, the the film exposure-state sensing and cartridge ejecting device 1A rotates until the top surface of the film cartridge 11A comes into contact with the L-shaped free end portion thereof, thus resulting in the completion of mounting of the film cartridge 11A (see FIG. 18). At this time, an electric contact (not shown), placed in the camera, is switched through the film exposure-state sensing and cartridge ejecting device 1A so that the information representative of the fact that the film cartridge 11A is completely mounted therein is delivered to a control section, not shown. Moreover, if a cover (not shown) for the film compartment 5A is closed after the mounting of the film cartridge 11A, as described before the information on the mounting of the film cartridge 11A is fed to the control section, whereupon the camera is placed into an operable condition.

Figure 19:
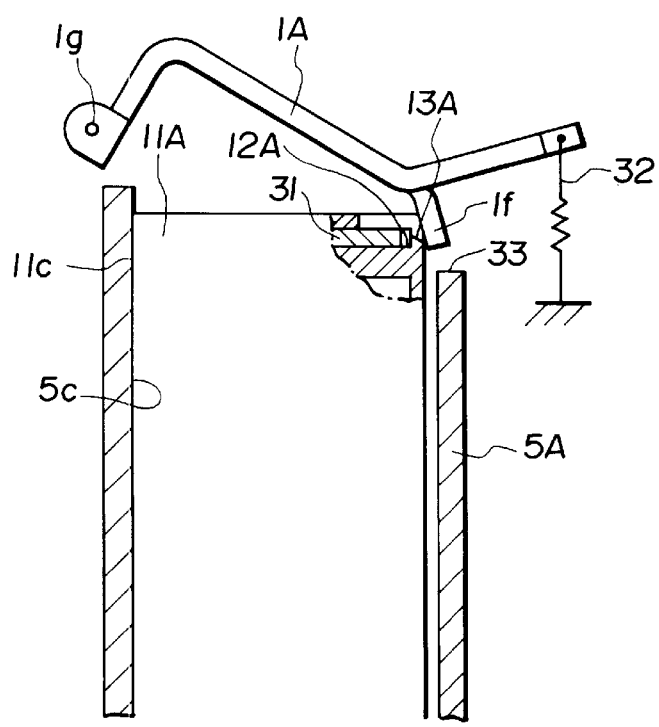
FIG. 19 is a side cross-sectional view of a principal portion of a film compartment mechanism, showing a state at the time of a film cartridge, which is in a non-exposed condition, being taken out from the film compartment in the camera according to the third embodiment.

Furthermore, a description will be taken hereinbelow of an operation of removing the film cartridge 11A in the third embodiment with reference to FIG. 19. When the cover for the film compartment 5A is opened after the completion of photography, the film exposure-state sensing and cartridge ejecting device 1A rotates in the direction of projecting the film cartridge 11A by the help of the biasing force of the elastic member 32. At this time, the film cartridge 11A is pressed by the engaging section 1f so that its circumferential surface 11c moves toward the inner wall surface 5c of the film compartment 5A. Owing to the frictional force arising with this pressing, the film cartridge 11A is held in a state slightly protruding from an opening portion of the film compartment 5A. Accordingly, even if the camera is turned upside down, the film cartridge 11A can be prevented from dropping out of the camera. The user can take out the film cartridge 11A by picking up its slightly protruding tip portion by his fingers or the like.

In addition to the effects of the above-described first embodiment, the camera according to this third embodiment is capable of safely and surely taking out the film cartridge concurrent with preventing it from inadvertently dropping out of the camera.

Figure 20:
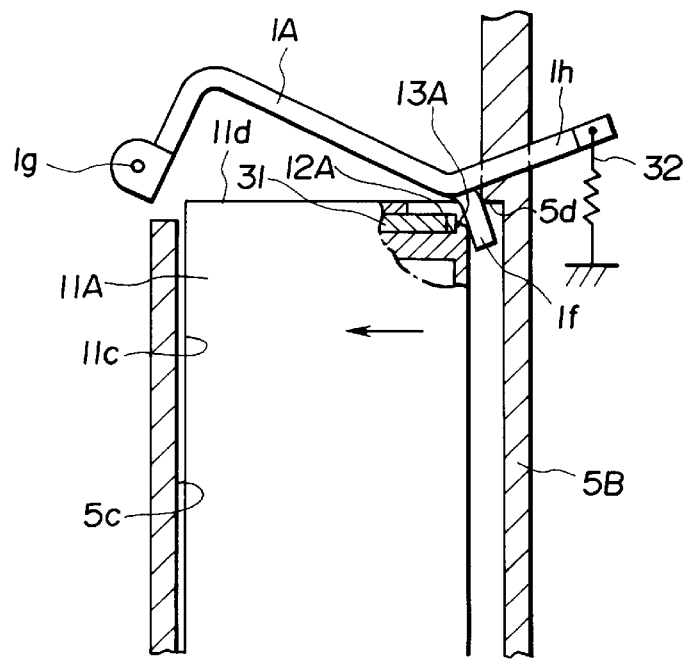
FIG. 20 is a side cross-sectional view of a principal portion of a film compartment mechanism, showing a state where a film cartridge, which is in a non-exposed condition, is still being put in the film compartment in a camera according to a fourth embodiment of the present invention.
Figure 21:
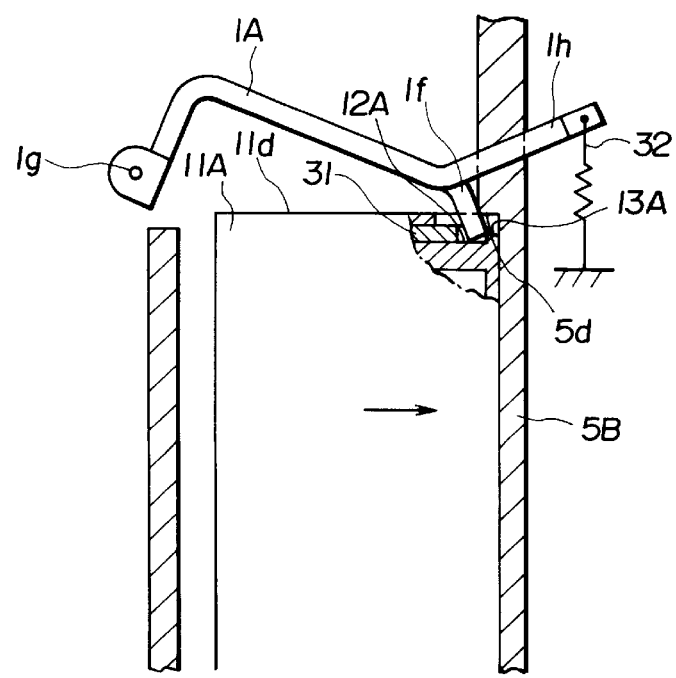
FIG. 21 a side cross-sectional view of a principal portion of a film compartment mechanism, showing a state where a film cartridge, which is in a condition other than a non-exposed condition, is still being placed in the film compartment in the camera according to the fourth embodiment.

Still further, a description will be made hereinbelow of a fourth embodiment of the present invention. FIGS. 20 to 21 are side cross-sectional views of a principal portion of a camera cartridge chamber, showing a film compartment and a film exposure-state sensing and cartridge ejecting device in a camera according to the fourth embodiment and further showing a film cartridge to be mounted in the film compartment. FIG. 20 is a side cross-sectional view of a principal portion, illustrating a state in which a film cartridge being in a non-exposed condition is loaded in the film compartment in the camera according to the fourth embodiment. In the illustration, the film cartridge is halfway inserted therein.

As illustrated, the camera according to this fourth embodiment can accept a film cartridge 11A similar to that of the above-described third embodiment, while on the bottom portion of a film compartment 5B is provided a film exposure-state sensing and cartridge ejecting device 1A similar to that of the third embodiment. In addition, as well as the third embodiment an elastic member 32 is stretched between the tip portion of the aforesaid arm and a certain portion of the camera body so that the free end portion of the film exposure-state sensing and cartridge ejecting device 1A is biased downwardly in the illustration, i.e., clockwise about shaft 1g.

The film compartment 5B has a hollow cylindrical configuration with two different diameters, with the diameter of a portion extending from a substantially middle portion to the bottom being smaller than that of an opening portion so that a step 5d exists at the boundary between the larger-diameter portion and the smaller-diameter portion. The smaller-diameter portion is substantially equal in diameter to the diameter of the film cartridge 11A, and in order to hinder the rotation of the film exposure-state sensing and cartridge ejecting device 1A, a portion corresponding to the rotational locus of a tip portion 1h of the film exposure-state sensing and cartridge ejecting device 1A is cut out. Incidentally, it is also possible that the step between the smaller-diameter portion and the larger-diameter portion is constructed as a projection protruding inwardly.

Secondly, referring to FIG. 20 a description will be made hereinbelow of an operation carried out for when the film cartridge 11A including a film in a non-exposed condition is loaded in the film compartment 5B. According to this fourth embodiment, as well as the above-mentioned third embodiment, responding to the insertion of the non-exposed condition film cartridge 11A, the engaging section 1f of the film exposure-state sensing and cartridge ejecting device 1A separates from a side edge portion of a disc 31 and then slides along an inclined section 13A, thereby pressing the film cartridge 11A toward an inner wall surface 5c thereof (the arrow direction in the illustration). With further insertion from this state, the film cartridge 11A is inserted into the smaller-diameter portion to be completely mounted in the film compartment 5B.

Furthermore, referring to FIG. 21 a description will be made hereinbelow of an operation taken for when mounted in the film compartment 5B is the film cartridge 11A whose film is in a condition other than the non-exposed condition, i.e., in an exposure-completed condition, a partially exposed condition or a development-completed condition. According to this fourth embodiment, as well as the third embodiment, in response to the insertion of such a film cartridge 11A, the engaging section 1f of the film exposure-state sensing and cartridge ejecting device 1A is fitted in between the side edge portion of the disc 31 and an outer wall of a ring-like recess portion 12A to press the film cartridge 11A in the arrow direction in the illustration. When in this state the film cartridge 11A is inserted thereinto, a top surface 11d of the film cartridge 11A comes into contact with the aforesaid step 5d which, in turn, inhibits further insertion of the film cartridge 11A. This prevents the film cartridge 11A from being mounted therein when the film encased assumes a condition other than the non-exposed condition.

In addition to the effects of the first embodiment, the camera according to this fourth embodiment can reduce the pressure on the film exposure-state sensing and cartridge ejecting device 1A even if the film cartridge 11A is inserted with a strong force, thus preventing damages to the device 1A.

Figure 22:
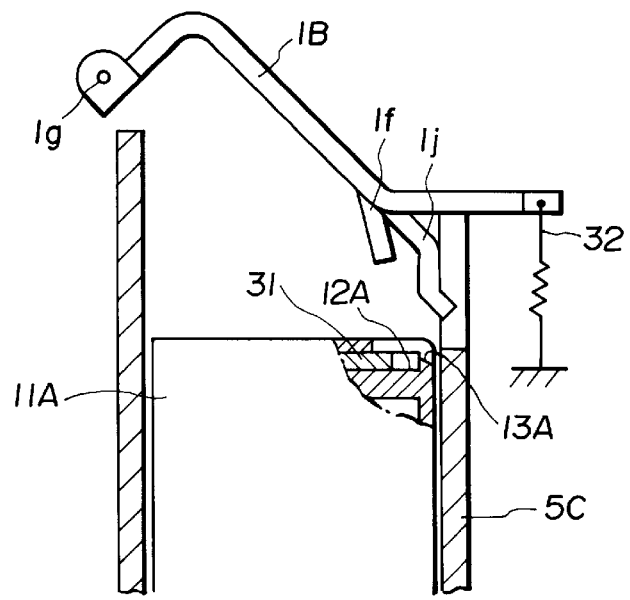
FIG. 22 is a side cross-sectional view of a principal portion of a film compartment mechanism, showing a state where a film cartridge, which is in a condition other than a non-exposed condition, is still being set in the film compartment in a camera according to a fifth embodiment of the present invention.

Moreover, a description will be made hereinbelow of a fifth embodiment of the present invention. FIGS. 22 to 25 are side cross-sectional views of a main portion of a camera cartridge chamber, showing a film compartment and a film exposure-state sensing and cartridge ejecting device in a camera according to the fifth embodiment, and further illustrating a film cartridge to be mounted in the film compartment. FIG. 22 is a side cross-sectional view of a main portion of the camera cartridge chamber, showing a state in which the film cartridge whose film is in a condition other than an non-exposed condition is loaded in the film compartment in the camera according to the fifth embodiment. In the illustration, the film cartridge is halfway inserted therein.

As illustrated, the camera according to the fifth embodiment can accommodate a film cartridge 11A similar to those of the third and fourth embodiments, and on a bottom portion of a film compartment 5C there is provided a film exposure-state sensing and cartridge ejecting device 1B which substantially has the same construction as those of the third and fourth embodiments. In addition, between the tip portion of the aforesaid arm and a given portion of the camera body there is stretched an elastic member 32 whereby the free end portion of the film exposure-state sensing and cartridge ejecting device 1B is biased downwardly in the illustration, i.e., clockwise about shaft 1g. The film exposure-state sensing and cartridge ejecting device 1B is equipped with a holding section 1j extending from the vicinity of the proximal portion of an engaging section 1f in a substantially zigzag fashion. In addition, a portion of the wall portion of the film compartment 5C meeting the rotational locus of the holding section 1j is cut out.

Figure 23:
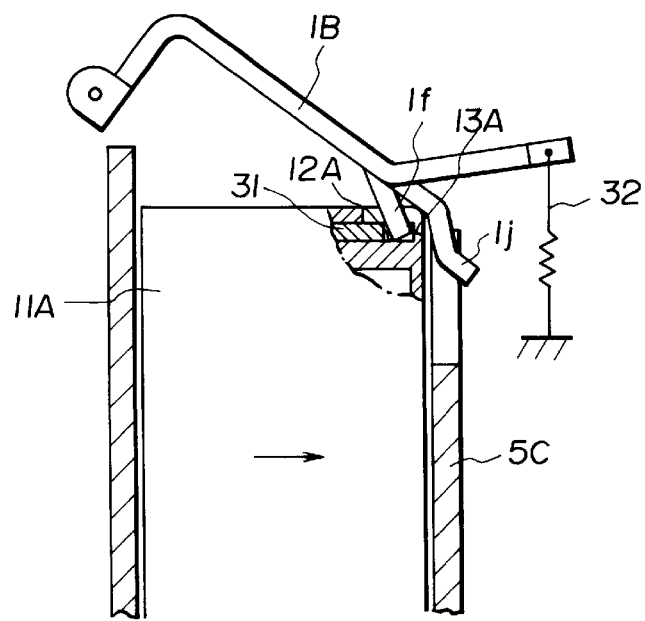
FIG. 23 is a side cross-sectional view of a principal portion of a film compartment mechanism, showing a state where a film cartridge, which is in a condition other than a non-exposed condition, has been set in the film compartment in the camera according to the fifth embodiment.
Figure 24:
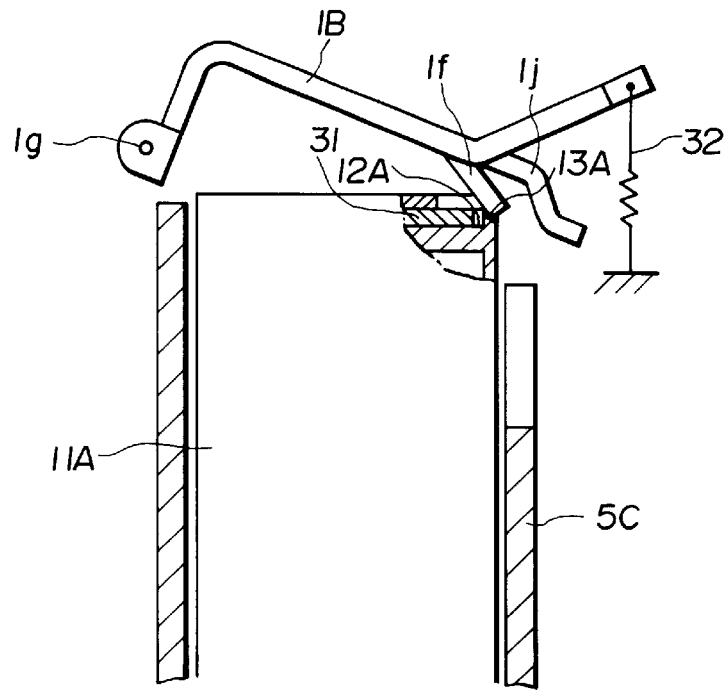
FIG. 24 is a side cross-sectional view of a principal portion of a film compartment mechanism, showing a state where a film cartridge, which is in a non-exposed condition, is still being inserted into the film compartment in a camera according to the fifth embodiment.

Secondly, referring to FIG. 23 a description will be taken hereinbelow of an operation for when mounted in the film compartment is the film cartridge accommodating a film which is in a condition other than a non-exposed condition, i.e., in an exposure-completed condition, a partially exposed condition or a development-finished condition. According to this fifth embodiment, as well as the third embodiment, when the film cartridge 11A being in such a condition is inserted thereinto, the engaging section 1f of the film exposure-state sensing and cartridge ejecting device 1B is fitted in between a side edge portion of a disc 31 and an outer wall of a ring-like recess portion 12A to press the film cartridge 11A in the arrow direction in the illustration. In further inserting the film cartridge 11A from this state, like the third embodiment, the further insertion thereof is blocked due to the frictional force between the circumferential surface of the film cartridge 11A and the inner wall surface of the film compartment 5C.

Moreover, a description will be taken hereinbelow of an operation for when the film cartridge 11A containing a film in a non-exposed condition is loaded in the film compartment 5C. According to this fifth embodiment, like the third embodiment, when a film cartridge 11A in a non-exposed condition is inserted into the film compartment 5C, the tip portion of the engaging section 1f comes into contact with a side edge portion of a larger-diameter section of a disc 31.

When the film cartridge 11A is further inserted from this state, the engaging section 1f is slightly pushed up against the biasing force of the elastic member 32 by the side edge portion of the disc 31, whereupon the film exposure-state sensing and cartridge ejecting device 1B rotates around a shaft 1g. Further, simultaneously with further insertion of the film cartridge 11A from this state, the engaging section 1f separates from the side edge portion of the disc 31 and then slides along the inclined surface of the inclined section 13A, with the result that the film exposure-state sensing and cartridge ejecting device 1B additionally rotates until the top surface of the film cartridge 11A comes into contact with the L-shaped bent free end portion of the film exposure-state sensing and cartridge ejecting device 1B, thus completing the mounting thereof.

Figure 25:
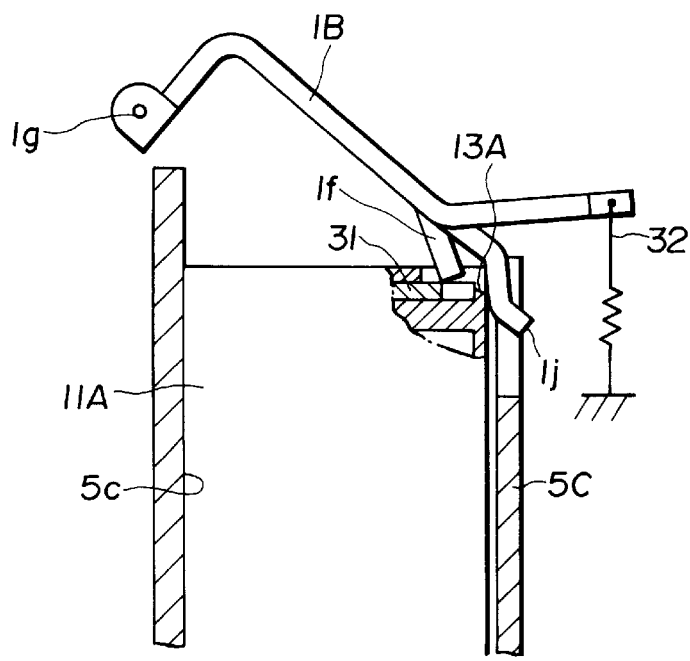
FIG. 25 is a side cross-sectional view of a principal portion of a film compartment mechanism, showing a state at the time of a film cartridge, which is in a condition other than a non-exposed condition, being removed from the film compartment in the camera according to the fifth embodiment.

Furthermore, referring to FIG. 25 a description will be made hereinbelow of an operation for when the film cartridge 11A is taken out from the film compartment 5C, in the camera according to the fifth embodiment. If a cover for the film compartment 5C is opened after the termination of photography, the film exposure-state sensing and cartridge ejecting device 1B rotates in the direction of projecting the film cartridge 11A by means of the biasing force of the elastic member 32. Subsequently, the holding section 1j of the film exposure-state sensing and cartridge ejecting device 1B presses the film cartridge 11A against the inner wall surface 5c which is in opposed relation thereto, whereupon the film cartridge 11A is held in a state of slightly projecting from the opening portion of the film compartment 5C. Accordingly, even if the camera is turned upside down, like the third embodiment the film cartridge 11A can be prevented from inadvertently dropping out of the camera. The user can take out the film cartridge 11A by picking up its slightly projected tip portion by his fingers or the like.

In this fifth embodiment, after the termination of photography, the film cartridge 11A can be held irrespective of variation or no variation of the state of the disc 31. In addition to the effects of the above-described first embodiment, the camera according to the fifth embodiment is capable of more surely and safely removing the film cartridge 11A concurrent with preventing it from inadvertently dropping out of the camera.

Although in the above-mentioned respective embedments the mounting of the film cartridge is inhibited when the film housed therein is in an exposure-completed condition, a partially exposed condition and a development-finished condition, it is also appropriate that the film cartridge is blocked when the film encased is in an exposure-completed condition or a development-finished condition.

As described above, according to the aforesaid embodiments it is possible to provide a camera where the mounting of the film cartridge is allowed to be mounted in accordance with the exposed condition of the film and can certainly be taken out after the completion of photography. In addition, it is possible to provide a camera which can prevent the film cartridge from dropping at the ejection In this invention, it is apparent that working modes different in a wide range can be formed on this basis invention without departing from the spirit and scope of the invention. This invention is not restricted by any specific embodiment except may be limited by the appended claims.

What is claimed is:

1. A camera using a film cartridge equipped with indicating means for indicating an exposed state of a film housed within said film cartridge, said indicating means being movable from a non-exposed condition indicating position for indicating that said film is in a non-exposed condition to a partially exposed condition indicating position for indicating that said film is in a partially exposed condition or in a completely exposed condition indicating position for indicating that said film is in a completely exposed condition, said camera comprising:

a film compartment for accommodating said film cartridge so that said film cartridge is mounted therein, said film compartment having an open end;

a cover member for closing the open end of said film compartment; and ejecting means pivotally mounted at a fixed location in said camera adjacent a bottom of said film compartment opposite said open end and forcing said film cartridge against a sidewall in said film compartment for blocking mounting of said film cartridge to a properly mounted position next to the bottom of the film compartment when said exposure-state indicating means takes said completely exposed condition indicating position, and for allowing said film cartridge to be mounted to the properly mounted position when the film cartridge is in one of said non-exposed condition indicating position and said partially exposed condition indicating position whereby said ejecting means is prevented from forcing said film cartridge against said sidewall, and further for pushing said film cartridge out of said film compartment when said film cartridge is in the properly mounted position and said cover member is opened after completion of photography.

2. A camera using a film cartridge equipped with indicating means for indicating an exposed state of a film housed within said film cartridge, said indicating means being movable from a non-exposed condition indicating position for indicating that said film is in an non-exposed condition to a partially exposed condition indicating position for indicating that said film is in a partially exposed condition or in a completely exposed condition indicating position for indicating that said film is in a completely exposed condition, said camera comprising:

a film compartment for accommodating said film cartridge so that said film cartridge is mounted therein, said film compartment having an open end;

a cover member for closing the open end of said film compartment; and ejecting means swingably mounted at a fixed location in said camera adjacent a bottom of said film compartment and forcing said film cartridge against sidewall in said film compartment for blocking mounting of said film cartridge to a properly mounted position next to a bottom of the film compartment when said exposure-state indicating means takes one of said completely exposed condition indicating position and said partially exposed condition indicating position, and for allowing said film cartridge to be mounted to the properly mounted position when the film cartridge is in said non-exposed condition indicating position whereby said indicating means prevents said ejecting means from forcing said film cartridge against said sidewall, and further for pushing said film cartridge out of said film compartment when said film cartridge is in the properly mounted position and said cover member is opened after completion of photography.

3. A camera as defined in claim 1 or 2, wherein said ejecting means is located at said bottom of said film compartment.

4. A camera as defined in claim 1, wherein, when said exposure-state indicating means is at said completely exposed condition indicating position before said film cartridge is mounted in said film compartment, said ejecting means engages a ring-like lip portion formed on said film cartridge and cooperates with said sidewall which comprises a film cartridge mounting guide wall formed within said film compartment to inhibit insertion of said film cartridge into the proper position in said film compartment.

5. A camera as defined in claim 2, wherein, when said exposure-state indicating means takes one of said completely exposed condition indicating position and said partially exposed condition indicating position before said film cartridge is mounted in said film compartment, said ejecting means engages a ring-like lip portion formed on said film cartridge and, together with said sidewall, which comprises a film cartridge mounting guide wall formed within said film compartment, inhibits insertion of said film cartridge into said film compartment.

6. A camera as defined in claim 4 or 5, wherein said ejecting means is biased to normally move toward an interior of said film compartment and is equipped with an exposure-state sensing section for engaging said exposure-state indicating means.

7. A camera as defined in claim 6, wherein said exposure-state sensing section of said ejecting means comprises a bar-like end portion.

8. A camera using a film cartridge equipped with indicating means for indicating an exposed state of a film housed within said film cartridge, said indicating means being movable from a non-exposed condition indicating position for indicating that said film is in a non-exposed condition to a partially exposed condition indicating position for indicating that said film is in a partially exposed condition, in a development-completed condition indicating position for indicating that said film is in a development-completed condition or in a completely exposed condition indicating position for indicating that said film is in a completely exposed condition, said camera comprising:

a film compartment for accommodating said film cartridge so that said film cartridge is mounted therein, said film compartment having an open end;

a cover member for closing the open end of said film compartment; and ejecting means mounted to pivot at a fixed point on said camera adjacent a bottom of said film compartment and forcing the film cartridge against a sidewall in the film compartment for blocking mounting of said film cartridge to a proper mounting position next to a bottom of the film compartment when said exposure-state indicating means takes one of said development-completed condition indicating position and said completely exposed condition indicating position, and for allowing said film cartridge to be mounted therein at said proper mounting position when said indicating means takes one of said non-exposed condition indicating position and said partially exposed condition indicating position whereby said indicating means is prevented from forcing the film cartridge against said sidewall, and further for pushing said film cartridge out of said film compartment to the properly mounted position when said cover member is opened after completion of photography.

9. A camera using a film cartridge equipped with indicating means for indicating an exposed state of a film housed within said film cartridge, said indicating means being movable from a non-exposed condition indicating position for indicating that said film is in a non-exposed condition to a partially exposed condition indicating position for indicating that said film is in a partially exposed condition, in a development-completed condition indicating position for indicating that said film is in a development-completed condition or in a completely exposed condition indicating position for indicating that said film is in a completely exposed condition, said camera comprising:

a film compartment for accommodating said film cartridge so that said film cartridge is mounted therein, said film compartment having an open end;

a cover member for closing the open end of said film compartment; and ejecting means mounted to pivot at a fixed location in said camera adjacent a bottom of said film compartment and urging said film cartridge against a sidewall in said film compartment for blocking mounting of said film cartridge to a proper mounting position next to a bottom of the film compartment when said exposure-state indicating means takes one of said development-completed condition indicating position and said completely exposed condition indicating position, and for allowing said film cartridge to be mounted therein at said proper mounting position when said indicating means takes one of said non-exposed condition indicating position and said partially exposed condition indicating position whereby said ejecting means is prevented from urging said film cartridge against said sidewall, and further for pushing said film cartridge out of said film compartment to the properly mounted position when said cover member is opened after completion of photography.

10. A camera as defined in claim 9, wherein said ejecting means is constructed integrally with holding means which holds said film cartridge to prevent the cartridge from jumping out of said film compartment when being pushed out by said ejecting means.

11. A camera as defined in claim 10, wherein said ejecting means stops said film cartridge, said exposure-state indicating means of which is at said non-exposed condition indicating position, when said film cartridge is further inserted into said film compartment from a position at which said holding means holds said film cartridge.

12. A camera as defined in claim 10, further comprising means for switching an electrical contact in response to movement of said ejecting means.

13. A camera as defined in claim 10, wherein said holding means is equipped with an engaging section for holding an outer wall of said film cartridge together with an inner wall of said film compartment.

14. A camera as defined in claim 9, wherein said ejecting means is rotatably mounted.

15. A camera as defined in claim 10, wherein said holding means is rotatably mounted.

16. A camera as defined in claim 9 or 10, further comprising means for detecting a state in which mounting of said film cartridge whose exposure-state indicating means is at a position other than a non-exposed condition indicating position is blocked and a state in which mounting thereof is allowed, when said film cartridge is mounted in said film compartment.

17. A camera as defined in claim 9 or 10, further comprising a projection for blocking mounting of said film cartridge when said indicating means is at said condition other than said non-exposed condition indicating position.

18. A camera according to claim 1 or 2 wherein said ejecting means further comprises projection for blocking entry of a fully exposed film cartridge to a properly mounted position and for pushing a properly mounted film cartridge out of the film compartment when said cover member is opened.

19. A camera according to claim 1 or 2 wherein said ejecting means has a projection which engages an interior of an annular lip portion on a film cartridge being loaded when said film cartridge is in the exposed condition, to block said film cartridge from being properly mounted.

20. A camera according to claim 1, 2, 8 or 9 wherein said ejecting means has a projection which is pushed into a recess provided near a bottom end of the film cartridge to enable the film cartridge which is in an unexposed condition to be loaded in the film compartment.

21. A camera according to claim 1, 2, 8 or 9 wherein said ejecting means has a projection which enters into a recess in a movable annular lip at an end of a film cartridge which is in the exposed state to prevent the projection from entering a recess near a bottom of the film compartment.

22. A camera according to claim 21 wherein said projection engages said annular lip which is moved to a projection blocking position when the film cartridge is in the exposed state to prevent the film cartridge from being properly mounted in the film compartment.

23. A camera according to claims 1, 2, 8 or 9 wherein said ejecting means includes a projection swingable about a pivot arranged near a bottom end of the film compartment, said film compartment having a recess for receiving a free end of said projection when the projection is pushed by a film cartridge being mounted to a position adjacent to said bottom end, said projection being prevented from entering said recess by a movable annular lip on said film cartridge when said film cartridge is in a fully exposed condition.

24. A camera according to claim 1 wherein said ejecting means operates without need for an electrically powered motor.

25. A camera according to claim 1 wherein said ejecting means has a pivot portion extending across said bottom and into first and second openings along the sidewalls of the film compartment.

* * * * *

UNITED STATES PATENT AND TRADEMARK OFFICE
CERTIFICATE OF CORRECTION

PATENT NO : 5,950,032
DATED : September 7, 1999
INVENTOR(S): Sakurai et al

It is certified that error appears in the above-identified patent and that said Letters Patent are hereby corrected as shown below:

At col. 8, line 23, after "are" insert --constructed to be--.
At column 8, line 23, change "constructed" to --joined--.
At col. 10, line 51, after "section" insert --If is--.
At col. 11, line 17, delete "similarly".

Signed and Sealed this

Fifteenth Day of May, 2001

Attest:

NICHOLAS P. GODICI

Attesting Officer     Acting Director of the United States Patent and Trademark Office